US011806689B2

(12) United States Patent
Burla et al.

(10) Patent No.: US 11,806,689 B2
(45) Date of Patent: Nov. 7, 2023

(54) METHOD OF MAKING A FERTILIZER SEED CORE

(71) Applicant: SABIC Global Technologies B.V., Bergen op Zoom (NL)

(72) Inventors: Satish Burla, Bangalore (IN); Rajamalleswaramma Koripelly, Bangalore (IN); Gurumallappa Yoganand, Bangalore (IN); Samik Gupta, Bengaluru (IN); Sabeshan Kanagalingam, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 1305 days.

(21) Appl. No.: 16/076,105

(22) PCT Filed: Feb. 8, 2017

(86) PCT No.: PCT/IB2017/050683
§ 371 (c)(1),
(2) Date: Aug. 7, 2018

(87) PCT Pub. No.: WO2017/137902
PCT Pub. Date: Aug. 17, 2017

(65) Prior Publication Data
US 2021/0070671 A1 Mar. 11, 2021

Related U.S. Application Data
(60) Provisional application No. 62/292,393, filed on Feb. 8, 2016.

(51) Int. Cl.
*B01J 2/20* (2006.01)
*B29C 48/345* (2019.01)
(Continued)

(52) U.S. Cl.
CPC ............. *B01J 2/20* (2013.01); *B29C 48/04* (2019.02); *B29C 48/297* (2019.02);
(Continued)

(58) Field of Classification Search
CPC .......... B01J 2/20; B29C 48/04; B29C 48/345; B30B 11/221
See application file for complete search history.

(56) References Cited

U.S. PATENT DOCUMENTS 3,056,723 A 10/1962 Galloway
3,232,740 A 2/1966 Sor et al.
(Continued)

FOREIGN PATENT DOCUMENTS

AU 667645 2/1995
AU 2015212412 9/2016
(Continued)

OTHER PUBLICATIONS

Al-Kanani et al., "Volatilization of ammonia from urea-ammonium nitrate solutions as influenced by organic and inorganic additives." *Fertilizer research* 1990, 23, 113-119.
(Continued)

*Primary Examiner* — Seyed Masoud Malekzadeh
(74) *Attorney, Agent, or Firm* — Norton Rose Fulbright US LLP

(57) ABSTRACT

Described herein is a method of making a fertilizer granule. The method includes supplying a fertilizer component, an liquid component, a binder and a filler to a zoned extruder comprising a die head, a screw, and at least three zones; mixing the fertilizer component, liquid component, binder and filler to yield a thixotropic mixture; and passing the thixotropic mixture through the die head.

20 Claims, 1 Drawing Sheet

(51) Int. Cl.
  *B29C 48/04* (2019.01)
  *B30B 11/22* (2006.01)
  *B29C 48/285* (2019.01)
  *C05G 5/12* (2020.01)
  *B29L 31/00* (2006.01)

(52) U.S. Cl.
  CPC .......... *B29C 48/345* (2019.02); *B30B 11/221* (2013.01); *C05G 5/12* (2020.02); *B29L 2031/7004* (2013.01)

(56) References Cited

U.S. PATENT DOCUMENTS

| | | | |
|---|---|---|---|
| 3,300,294 A | 1/1967 | Hollstein | |
| 3,314,778 A | 4/1967 | Campbell et al. | |
| 3,322,528 A | 5/1967 | Hamamoto | |
| 3,326,665 A | 7/1967 | Schäfer et al. | |
| 3,331,677 A | 7/1967 | Campbell et al. | |
| 3,388,989 A | 6/1968 | Sor | |
| 3,400,011 A | 9/1968 | Fox | |
| 3,441,539 A | 4/1969 | Schafer et al. | |
| 3,499,748 A | 3/1970 | Fraser | |
| 3,825,414 A | 6/1974 | Lee et al. | |
| 3,846,529 A * | 11/1974 | Poteet, III | B30B 11/227 83/53 |
| 3,870,755 A | 3/1975 | Kamo et al. | |
| 3,954,436 A | 5/1976 | Vad et al. | |
| 3,961,329 A | 7/1976 | Naidich | |
| 3,962,329 A | 7/1976 | Schoenaich et al. | |
| 4,003,717 A * | 1/1977 | Cass | C22B 1/24 44/577 |
| 4,062,890 A | 12/1977 | Shank | |
| 4,082,533 A | 4/1978 | Wittenbrook et al. | |
| 4,671,914 A * | 6/1987 | Prochazka | B30B 11/08 425/464 |
| 4,880,455 A | 11/1989 | Blank | |
| 4,994,100 A | 2/1991 | Sutton et al. | |
| 5,124,451 A | 7/1992 | Hackl et al. | |
| 5,169,954 A | 12/1992 | Hackl et al. | |
| 5,219,465 A | 6/1993 | Goertz et al. | |
| 5,240,400 A * | 8/1993 | Fujimoto | B30B 11/221 425/464 |
| 5,264,019 A | 11/1993 | Gossett, Jr. et al. | |
| 5,300,135 A | 4/1994 | Hudson et al. | |
| 5,352,265 A | 10/1994 | Weston et al. | |
| 5,399,186 A | 3/1995 | Derrah et al. | |
| 5,405,426 A | 4/1995 | Timmons | |
| 5,414,083 A | 5/1995 | Hackl et al. | |
| 5,466,274 A | 11/1995 | Hudson et al. | |
| 5,476,528 A | 12/1995 | Trimm | |
| 5,597,917 A | 1/1997 | Hackl et al. | |
| 5,645,624 A | 7/1997 | Naka et al. | |
| 5,741,521 A | 4/1998 | Knight et al. | |
| 5,803,946 A | 9/1998 | Petcavich et al. | |
| 5,843,347 A * | 12/1998 | Nguyen | B01J 2/04 264/28 |
| 5,851,261 A | 12/1998 | Markusch et al. | |
| 5,862,610 A | 1/1999 | Lipert | |
| 5,917,110 A | 6/1999 | Kust | |
| 5,976,210 A | 11/1999 | Sensibaugh | |
| 6,048,376 A | 4/2000 | Miller | |
| 6,048,378 A | 4/2000 | Moore | |
| 6,099,770 A * | 8/2000 | Akers | B01J 2/20 264/141 |
| 6,231,633 B1 | 5/2001 | Hirano et al. | |
| 6,391,454 B1 | 5/2002 | Mao et al. | |
| 6,500,223 B1 | 12/2002 | Sakai et al. | |
| 6,576,035 B2 | 6/2003 | Hartmann et al. | |
| 6,749,659 B1 | 6/2004 | Yu et al. | |
| 6,900,162 B2 | 5/2005 | Wertz et al. | |
| 6,936,573 B2 | 8/2005 | Wertz et al. | |
| 6,936,681 B1 | 8/2005 | Wertz et al. | |
| 7,213,367 B2 | 5/2007 | Wertz et al. | |
| 8,163,058 B2 | 4/2012 | Whitehurst | |
| 8,419,819 B2 | 4/2013 | Sutton | |
| 8,603,211 B2 | 12/2013 | Rahn et al. | |
| 9,034,072 B2 | 5/2015 | Gabrielson et al. | |
| 9,376,350 B2 | 6/2016 | Pursell et al. | |
| 9,394,210 B2 | 7/2016 | Gabrielson et al. | |
| 9,422,203 B2 | 8/2016 | Waliwitiya | |
| 9,446,993 B2 | 9/2016 | Li et al. | |
| 2003/0037485 A1* | 2/2003 | Carnegie | C10L 9/00 75/479 |
| 2003/0205072 A1 | 11/2003 | Van Der Merwe et al. | |
| 2003/0224031 A1 | 12/2003 | Heier et al. | |
| 2004/0001884 A1 | 1/2004 | Moroni et al. | |
| 2004/0016275 A1 | 1/2004 | Hartmann et al. | |
| 2004/0016276 A1 | 1/2004 | Wynnyk et al. | |
| 2004/0050127 A1 | 3/2004 | Ambri | |
| 2004/0163434 A1 | 8/2004 | Quin | |
| 2004/0182953 A1 | 9/2004 | Knoer | |
| 2006/0089259 A1 | 4/2006 | Driessen et al. | |
| 2006/0142157 A1 | 6/2006 | Birthisel et al. | |
| 2009/0270257 A1 | 10/2009 | Pursell et al. | |
| 2009/0317468 A1 | 12/2009 | Letmathe et al. | |
| 2010/0011825 A1 | 1/2010 | Ogle et al. | |
| 2010/0139348 A1 | 6/2010 | Wan et al. | |
| 2011/0036009 A1 | 2/2011 | Bissonnette et al. | |
| 2011/0154873 A1 | 6/2011 | Burnham et al. | |
| 2011/0275520 A1 | 11/2011 | Frey et al. | |
| 2012/0017659 A1 | 1/2012 | Pursell et al. | |
| 2012/0067094 A1 | 3/2012 | Pursell et al. | |
| 2012/0090366 A1 | 4/2012 | Pursell et al. | |
| 2013/0152649 A1 | 6/2013 | Kweeder et al. | |
| 2013/0231493 A1* | 9/2013 | Shishkov | B01J 35/023 428/34.4 |
| 2013/0259582 A1 | 10/2013 | Birthisel et al. | |
| 2013/0305796 A1 | 11/2013 | Hudson et al. | |
| 2014/0033779 A1 | 2/2014 | Bertin et al. | |
| 2014/0047884 A1 | 2/2014 | Gabrielson et al. | |
| 2014/0102156 A1 | 4/2014 | Pursell et al. | |
| 2014/0223978 A1 | 8/2014 | Kuo et al. | |
| 2014/0230322 A1 | 8/2014 | Zhang et al. | |
| 2014/0255605 A1 | 9/2014 | Van Kaathoven et al. | |
| 2015/0031786 A1 | 1/2015 | Lambeth | |
| 2015/0047402 A1 | 2/2015 | Walker et al. | |
| 2015/0052960 A1 | 2/2015 | Makin et al. | |
| 2015/0101379 A1 | 4/2015 | Gabrielson et al. | |
| 2015/0125639 A1* | 5/2015 | Rosen | C08J 3/203 428/220 |
| 2015/0152017 A1 | 6/2015 | Schumski et al. | |
| 2015/0197460 A1 | 7/2015 | Gabrielson et al. | |
| 2015/0239790 A1 | 8/2015 | Iwig et al. | |
| 2015/0291481 A1 | 10/2015 | Neff et al. | |
| 2015/0299062 A1 | 10/2015 | McKnight et al. | |
| 2016/0075609 A1 | 3/2016 | Gabrielson et al. | |
| 2016/0076062 A1 | 3/2016 | Medoff et al. | |
| 2016/0185682 A1 | 6/2016 | Katz | |
| 2016/0340265 A1 | 11/2016 | Kanagalingam et al. | |
| 2017/0088480 A1 | 3/2017 | Kannan et al. | |
| 2017/0362139 A1 | 12/2017 | Zhang et al. | |
| 2018/0022661 A1 | 1/2018 | Achille et al. | |
| 2018/0208513 A1 | 7/2018 | Kanagalingam et al. | |
| 2018/0208519 A1 | 7/2018 | Kanagalingam et al. | |
| 2018/0297903 A1 | 10/2018 | Ledoux et al. | |
| 2020/0039893 A1 | 2/2020 | Koripelly et al. | |
| 2020/0131098 A1 | 4/2020 | Hegde et al. | |
| 2020/0140353 A1 | 5/2020 | Hegde et al. | |

FOREIGN PATENT DOCUMENTS

| | | |
|---|---|---|
| CA | 2441175 | 3/2004 |
| CA | 2701995 | 10/2011 |
| CN | 1044450 A | 8/1990 |
| CN | 1126465 | 7/1996 |
| CN | 1145059 | 3/1997 |
| CN | 1417172 A | 5/2003 |
| CN | 1666972 | 9/2005 |
| CN | 101108781 | 7/2006 |
| CN | 1298679 | 2/2007 |
| CN | 101037371 | 9/2007 |
| CN | 101134695 | 3/2008 |
| CN | 101134697 | 3/2008 |

(56) References Cited

FOREIGN PATENT DOCUMENTS

| | | |
|---|---|---|
| CN | 101177365 | 5/2008 |
| CN | 101289350 | 10/2008 |
| CN | 101289353 | 10/2008 |
| CN | 101323545 | 12/2008 |
| CN | 101384523 | 3/2009 |
| CN | 101486614 | 7/2009 |
| CN | 101628838 | 1/2010 |
| CN | 101638348 | 2/2010 |
| CN | 101723752 | 6/2010 |
| CN | 102143927 | 8/2011 |
| CN | 102267842 | 12/2011 |
| CN | 102295491 | 12/2011 |
| CN | 102432388 | 5/2012 |
| CN | 102503686 | 6/2012 |
| CN | 102557838 | 7/2012 |
| CN | 102746073 | 10/2012 |
| CN | 102826917 | 12/2012 |
| CN | 102951968 | 3/2013 |
| CN | 103319120 | 9/2013 |
| CN | 103588576 | 2/2014 |
| CN | 103755450 | 4/2014 |
| CN | 103755498 | 4/2014 |
| CN | 103772074 | 5/2014 |
| CN | 103787798 | 5/2014 |
| CN | 103833490 | 6/2014 |
| CN | 103102216 B | 12/2014 |
| CN | 104177201 | 12/2014 |
| CN | 104230529 A | 12/2014 |
| CN | 104230575 | 12/2014 |
| CN | 104261723 | 1/2015 |
| CN | 104276877 | 1/2015 |
| CN | 104311366 | 1/2015 |
| CN | 104326847 | 2/2015 |
| CN | 102936169 | 4/2015 |
| CN | 104557278 | 4/2015 |
| CN | 105669332 | 6/2016 |
| DE | 1146080 | 3/1963 |
| DE | 1905834 | 11/1972 |
| DE | 142044 | 6/1980 |
| DE | 3042662 A1 | 6/1982 |
| DE | 4128828 | 3/1993 |
| DE | 19631764 | 2/1998 |
| EP | 0047556 | 3/1982 |
| EP | 0174247 A2 | 3/1986 |
| EP | 0255752 | 2/1988 |
| EP | 0491238 B1 | 6/1992 |
| EP | 0877722 | 11/1998 |
| EP | 1043295 | 10/2000 |
| EP | 1067093 | 12/2004 |
| EP | 1724247 A1 | 11/2006 |
| EP | 2431346 | 3/2012 |
| FR | 893153 | 6/1944 |
| FR | 893153 A | 6/1944 |
| FR | 1356105 A | 3/1964 |
| GB | 1212605 | 11/1970 |
| GB | 1435678 | 5/1976 |
| GB | 1535807 A | 12/1978 |
| JP | 348780 B2 | 7/1991 |
| JP | H07-033576 | 2/1995 |
| JP | H1116798 | 4/1999 |
| JP | H11263689 | 9/1999 |
| JP | H11278973 | 10/1999 |
| JP | 2001294792 | 10/2001 |
| KR | 100974639 | 8/2010 |
| KR | 101485578 | 12/2014 |
| NZ | 596113 | 8/2012 |
| SU | 429048 | 5/1974 |
| TW | 1549926 | 9/2016 |
| WO | 8900079 A1 | 1/1989 |
| WO | WO 1995/026942 | 10/1995 |
| WO | WO 1996/018591 | 6/1996 |
| WO | WO 2003/006399 | 1/2003 |
| WO | WO 2003/045877 | 6/2003 |
| WO | 03066207 A1 | 8/2003 |
| WO | 2004047974 A1 | 6/2004 |
| WO | 2004098858 A1 | 11/2004 |
| WO | WO 2005/075602 | 8/2005 |
| WO | WO 2006/044393 | 4/2006 |
| WO | WO 2007/022732 | 3/2007 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | 2013128402 A2 | 9/2013 |
| WO | WO 2014/189183 | 11/2014 |
| WO | WO 2015/001457 | 1/2015 |
| WO | WO 2015/114542 | 8/2015 |
| WO | WO 2015/170217 | 11/2015 |
| WO | WO 2016/091205 | 6/2016 |
| WO | WO 2016/107548 | 7/2016 |
| WO | WO 2016/186526 | 11/2016 |
| WO | WO 2017/013573 | 1/2017 |
| WO | WO 2017/081183 | 5/2017 |
| WO | WO 2017/087265 | 5/2017 |
| WO | WO 2017087264 | 5/2017 |
| WO | WO 2017/100507 | 6/2017 |
| WO | WO 2017/137902 | 8/2017 |
| WO | WO 2017/013572 | 10/2017 |
| WO | WO 2017/168288 | 10/2017 |
| WO | WO 2018/162533 | 9/2018 |
| WO | WO 2018/193344 | 10/2018 |
| WO | WO 2018/193345 | 10/2018 |
| WO | WO 2018/193358 | 10/2018 |
| WO | WO 2019/030671 | 2/2019 |
| ZA | 201105819 | 4/2012 |

OTHER PUBLICATIONS

Allison, "The enigma of soil nitrogen balance sheets," *Adv. Agro.* 1995, 7:213-250.

Al-Zahrani, S.M., "Utilization of Polyethylene and Paraffin Waxes as Controlled delivery Systems for Different Fertilizers" *Ind. Eng. Chem. Res.*, 2000, 39(2):367-371.

Bolan et al., "Soil Acidification and Liming Interactions with Nutrient and Heavy Metal Transformation and Bioavailability," *Advances in Agronomy*, 78:215-272, (2003).

Bose, et al., "New protocol for Biginelli reaction-a practical synthesis of Monastrol," *ARKIVOC*, 2005, 3:228-236.

Chien, et al., "Recent developments of fertilizer production and use to improve nutrient efficiency and minimize environmental impacts," *Adv. Agro.*, 2009, 102:267-322.

Ciurli, et al. "Structural properties of the nickel ions in; urease: novel insights into the catalytic and inhibition mechanisms," *Coord. Chem. Rev.* 1999, 331:190-192.

Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.

Gioacchini, et al., "Influence of urease and nitrification inhibitors on N losses from soils fertilized with urea," *Biology and Fertility of Soils*, 2002, 36(2):129-135.

Hays, "Symposium on Controlled Release Fertilizer," *J. Agri. Food*, 1971, 19:797.

International Preliminary Reporton Patentability issued in counterpart International Patent Application No. PCT/IB2015/050654, dated Aug. 2, 2016.

International Preliminary Reporton Patentability issued in International Patent Application No. PCT/IB2016/054271, dated Oct. 18, 2017.

International Search Report and Written Opinion issued in counterpart International Patent Application No. PCT/IB2015/050654, dated May 19, 2015.

International Search Report and Written Opinion issued in counterpart International Patent Application No. PCT/IB2016/054271, dated Oct. 24, 2016.

International Search Report and Written Opinion issued in counterpart International Application No. PCT/IB2015/053056, dated Sep. 23, 2015.

(56) References Cited

OTHER PUBLICATIONS

International Search Report and Written opinion issued in International Application No. PCT/IB2018/052577, dated Aug. 1, 2018.
International Search Report and Written opinion issued in International Application No. PCT/IB2018/052578, dated Aug. 1, 2018.
International Search Report and Written opinion issued in International Application No. PCT/IB2018/052630, dated Aug. 9, 2018.
International Search Report and Written opinion issued in International Application No. PCT/IB2018/055946, dated Dec. 3, 2018.
International Search Report and Written Opinion issued in International Application No. PCT/IB2016/054270, dated Oct. 24, 2016.
International Search Report and Written opinion issued in International Application No. PCT/IB2017/050683, dated Jun. 20, 2017.
International Search Report and Written Opinion issued in International Patent Application No. PCT/US2016/061486, dated Jan. 25, 2017.
International Search Report and Written Opinion issued in International Patent Application No. PCT/US2016/061487, dated Jan. 5, 2017.
Jarosiewicz & Tomaszewska, "Controlled-release NPK fertilizer encapsulated by polymeric membranes," *Journal of Agricultural and Food Chemistry*, 2003, 51(2):413-417.
Kawakami, et al., "Physiological and yield responses of field-grown cotton to application of urea with the urease inhibitor NBPT and the nitrification inhibitor DCD," *European Journal of Agronomy*, 2012, 43:147-154.
Lunt, et al., "Properties and Value of 1,1 -Diureido Isobutane (IBDU) as a Long-Lasting Nitrogen Fertilizer," *J. Agr. Food Chem.*, 1969, 17(6):1269-1271.
Mahmood et al., "Calcium Carbide-Based Formulations cause Slow Release of Acetylene and Ethylene in Soil and Nitrification Inhibition," *Communications in Soil Science and Plant Analysis*, 2014, 45(17): 2277-2288.
Mahmood et al., "Effect of rate and application depth matrix-I calcium carbide based formulation on growth, yield and nitrogen uptake of wheat," *African Journal of Agricultural Research*, 2011, 6(30): 6363-6398.
Mahmood et al., "Nutritional and physiological response of wheat to soil applied matrix-I formulated calcium carbide with and without nitro gen fertilizer," *Pakistan Journal of Nutrition* 2012, 11(2): 154-159.
Office Action and Search Report issued in Corresponding Taiwanese Patent Application No. 104114189, dated May 9, 2019.
Office Action issued in corresponding Chinese Patent Application No. 201580008733.2, dated Jan. 11, 2019. (Machine Translation Provided).
Office Action issued in corresponding Chinese Patent Application No. 2015800087332, dated Jun. 13, 2019.
Office Action issued in corresponding Chinese Patent Application No. 201680051745.8, dated Jul. 23, 2019.
Office Action issued in corresponding Indian Patent Application No. 201617028561, dated Jun. 18, 2019.
Office Action issued in corresponding Taiwanese Patent Application No. 105122936, dated Sep. 5, 2019.
Office Action issued in corresponding Chinese Patent Application No. 201680051728.4, dated Aug. 11, 2020.
Office Action issued in European Patent Application No. 16741394.7, dated Dec. 7, 2018.
Patra, et al., "Use of urea coated with natural products to inhibit urea hydrolysis and nitrification in soil," *Biol. Fertil. Soils*, 2009, 45:617-621.
Reddy, et al., New environmentally friendly solvent free syntehesis of dihydropyrimidinones catalysed by N-butyl-N, N-dimethylphenylethylammonium bromide, *Tetrahedron Letters*, 2003, 44:8173-8175.
Sanz-Cobena, et al., "Gaseous emissions of N2O and NO and NO3-leaching from urea applied with urease and nitrification inhibitors to a maize (*Zea mays*) crop," *Agriculture, Ecosystems & Environment*, 2012, 149:64-73.

Search Report issued in corresponding Chinese Patent Application No. 201680051745.8, dated Jul. 2, 2019.
Search Report issued in corresponding Chinese Patent Application No. 201680051728.4, dated Aug. 5, 2020.
Sinclair et al., "Radiation Use Efficiency," *Advances in Agronomy* 1999, 65: 215-265.
Soares, et al., "Ammonia volatilization losses from surface-applied urea with urease and nitrification inhibitors," *Soil Biology and Biochemistry*, 2012, 52:82-89.
Subbarao, et al., "Scope and Strategies For Regulation of Nitrification in Agricultural Systems—Challenges and Opportunities," *Crit. Rev. Plant Sci.*, 2006, 25-303-335.
Trenkel, "Controlled-release and stabilized fertilizers in agriculture." *International fertilizer industry association* 1997, 11:1-156.
Upadhyay,"Urease inhibitors: A review." *Indian Journal of Biotechnology* 2012, 11:381-388.
Watson, et al., "Rate and mode of application of the urease inhibitor N-(n-butyl) thiophosphoric triamide on ammonia volatilization from surface-applied urea," *Soil Use and Management*, 2008, 24:246-253.
Wu, et al., "Guidelines For The Use of Fertilizers," *Chinese Agricultural Press*, 2000, 122-123. (English Translation).
Yixing, et al. "Application Technology of Novel Slow and Controlled Release Fertilizer," *China Three Gorges Press*, 2008, 1, pp. 90 and 92.
Yongkang, et al. "Modern Drying Technology," *Chemical Industry Press*, 2007, 1:719-722.
Zaman, et al., "Effects of urease and nitrification inhibitors on the efficient use of urea for pastoral systems," *J. Soil Science and Plant Nutrition*, 2013, 59(4):649-659.
Zaman, et al., "Improving pasture growth and urea efficiency using N inhibitor, molybdenum and elemental Sulphur," *Journal of Soil Science and Plant Nutrition*, 2014, 14(1):245-257.
Dongpo et al., "Soil biological activities at maize seedling stage under application of slow/controlled release nitrogen fertilizers" *Chinese Journal of Applied Ecology* 2006, 17(6), 1055-1059 (English Translation of conclusion).
Office Action issued in Corresponding Chinese Application No. 201680051728.4, dated Jun. 3, 2021 (No English Translation provided).
Office Action issued in Corresponding Chinese Application No. 201911019580.8, dated Jul. 13, 2021 (English Translation provided).
Office Action issued in Corresponding Chinese Application No. 201880039588.8, dated Jul. 14, 2021 (English Translation provided).
Chinese Patent No. 103102216; Date of Publication: Dec. 10, 2014; Abstract Only, 1 page.
German Patent No. 3042662; Date of Publication: Jun. 3, 1982; Abstract Only, 1 page.
French Patent No. 1356105; Date of Publication: Mar. 20, 1964; Machine Translation, 7 pages.
French Patent No. 893153; Date of Publication: Jun. 1, 1944; Machine Translation, 3 pages.
International Search Report for International Application No. PCT/IB2017/050683; dated Jun. 20, 2017; 7 pages.
Japanese Patent No. 348780; Date of Publication: Jul. 25, 1991; Machine Translation, 7 pages.
Written Opinion of the International Search Report for International Application No. PCT/IB2017/050683; dated Jun. 20, 2017; 10 pages.
Office Action issued in corresponding Chinese Application No. 201880040046.2, dated Sep. 1, 2021.
Office Action issued in corresponding Chinese Application No. 202010394499.4, dated Oct. 9, 2021.
Office Action issued in corresponding Chinese Application No. 201680051728.4, dated Oct. 27, 2021.
Azeem, et al. "Review on materials & methods to produce controlled release coated urea fertilizer," *Journal of Controlled Release*, 2014, 181:11-21.
Babu, et al. "Current Progress on bio-based polymers and their future trends," *Progress in Biomaterials*, 2013, 2:8.

(56) References Cited

OTHER PUBLICATIONS

Extended European Search Report issued in counterpart European Patent Application No. 20166713.6, dated Nov. 11, 2020.
Extended European Search Report issued in European Application No. 1686688.7, dated Jun. 13, 2019.
Lookchem. "Hydroxypropyl methyl cellulose," https://www.lookchem.com/Hydroxypropyl-methyl-cellulose/ pp. 1-2, 2015.
Lubkowski, "Coating Fertilizer Granules with Biodegradable Materials for Controlled Fertilizer Release," Environmental Engineering and Management Journal, 2014, 13:2573-2581.
Office Action issued in counterpart Chinese Patent Application No. 201680051745.8, dated Dec. 2, 2020.
Office Action and Search Report issued in Corresponding Chinese Application No. 201880040397.3, dated Mar. 30, 2022.
Cantarella et al., "Agronomic efficiency of NBPT as a urease inhibitor: A review." Journal of advanced research 2018, 13, 19-27.
Dillon et al., "Nitrogen sources and timing effects on nitrogen loss and uptake in delayed flood rice." Agronomy Journal 2012, 104, 466-472.
Mahmood et al., "Dicyandiamide increases the fertilizer N loss from an alkaline calcareous soil treated with 15N-labelled urea under warm climate and under different crops." Biol Fertil Soils 2011, 47:619-631.
Soliman et al., "Effect of method of N-application and modified urea on N-15 recovery by rice." Fertilizer research 43.1 (1995): 143-148.

\* cited by examiner

METHOD OF MAKING A FERTILIZER SEED CORE

CROSS REFERENCE TO RELATED APPLICATIONS

This application is a 371 of International Application No. PCT/IB2017/050683, filed Feb. 8, 2017, which claims priority to U.S. Application No. 62/292,393 filed Feb. 8, 2016, both of which are incorporated herein by reference in their entirety.

BACKGROUND

Granular fertilizers are widely used to increase plant growth. Granular fertilizers can comprise a seed core. The production of the fertilizer seed core by extrusion can be problematic. Issues arrive with seed core integrity, material flow and pelletization, particularly when the extrusion composition is thixotropic. Accordingly, there is a need in the art for a method of making fertilizer seed cores by extrusion.

SUMMARY

Disclosed herein is a method of making a fertilizer seed core, the method comprising: supplying a fertilizer component, a liquid component, a binder and a filler to a zoned extruder comprising a die head, a screw, and at least three zones; mixing the fertilizer component, liquid component, binder and filler to yield a thixotropic mixture; and passing the thixotropic mixture through the die head, wherein the die head comprises openings 0.5 to 4 millimeter in diameter and wherein the end of the screw is 1 to 15 millimeters from the die head.

Also disclosed herein is a method of making a fertilizer seed core, the method comprising: supplying a fertilizer component, a liquid component, a binder and a filler to a zoned extruder comprising a die head, a screw, and at least three zones; mixing the fertilizer component, liquid component, binder and filler to yield a thixotropic mixture; and passing the thixotropic mixture through the die head, wherein the die head comprises openings 0.5 to 4 millimeter in diameter and wherein the extrusion process has a residence time of 5 seconds to 15 minutes.

The above described and other features are further set forth in the following figures, detailed description and claims.

BRIEF DESCRIPTION OF THE DRAWINGS

The following figures are exemplary embodiments wherein the like elements are numbered alike.

DETAILED DESCRIPTION

According to the method of making a fertilizer seed core, a fertilizer component, a liquid component, e.g., an aqueous component, binder, filler, and optional additives are supplied to an extruder having at least three zones. The method can include supplying a viscoelastic agent to the agent. The binder, when mixed with the liquid component, forms a mixture which decreases viscosity when subjected to shear stress. The decrease in viscosity results in issues of seed core integrity, material flow and pelletization. It has been found that extrusion can be effectively achieved by supplying the liquid component to the extruder simultaneously with the binder or after the binder. When the liquid component is supplied to the extruder before the binder issues arise with the unequal distribution of components of the composition and uneven density, sometimes even resulting in lumps in the composition.

The dry ingredients, namely the fertilizer component, the binder, the filler and any dry additives, may be added to the extruder sequentially or simultaneously. In some embodiments the fertilizer component and the binder are dry mixed prior to being supplied to the extruder. Any dry additives can be included in the dry mix. Alternatively any dry additives can be supplied to the extruder simultaneously or sequentially with the dry mix.

The liquid ingredients, namely the liquid component and any liquid additives, can be added with some or all of the dry ingredients as long as the binder is added before the liquid component or simultaneously with the liquid component.

In some embodiments, the fertilizer component, the binder and any dry additives are supplied to the first zone of the extruder to form a first composition which is mixed as it is moved to a second zone of the extruder where the liquid component is supplied to the extruder to form a second composition. The second composition is mixed as it is moved to the die head. The first and second zones may be operated at a temperature of 0 to 70 degrees Celsius, for example, 0 to 40 degrees Celsius. In some embodiments the temperature of the first and second zones is substantially the same. The die head may be operated at a temperature of 0 to 70 degrees Celsius.

The term "first zone" and "second zone" as used in this context does not exclude extruder designs where the first zone or second zone consists of two or more separate zones of the extruder with the proviso that the second zone is downstream of the first zone. Additionally, it is expressly contemplated that an additional zone or zones may intervene between the first zone and second zone.

Figure 1:
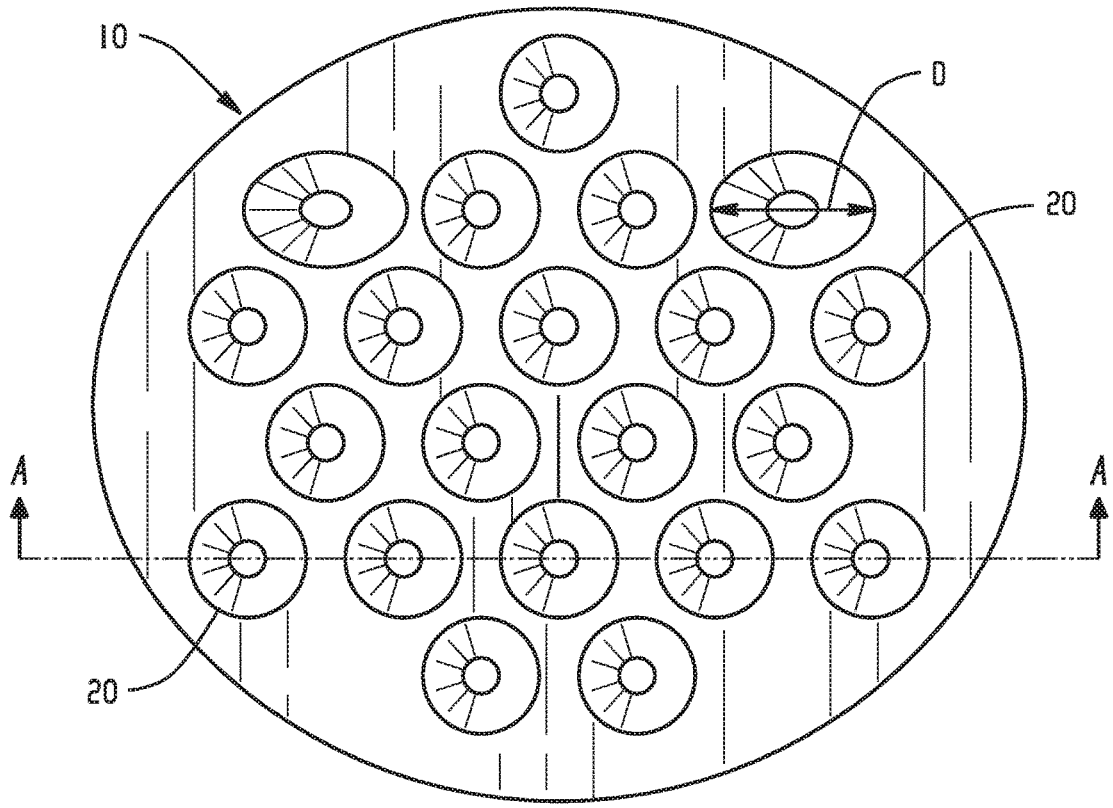
FIG. 1 is a representation of the intake side of a die head having conical openings.

In some embodiments the die head has a dead space of 1 to 6 millimeters (mm), or 7 to 10 mm, or 1 to 15 mm. The dead space is the distance between the end of the extruder screw and the die head. Additionally, the die head can comprise eccentric openings. When the openings are eccentric the diameter of the openings refers to the longest linear dimension. This is shown in FIG. 1 as "D". The die head openings can have a diameter of 0.5 to 4.0 millimeters on the outflow side. The land length of the die head openings (the distance from the inside of the extruder to the outside of the extruder) can be 3 to 10 mm, or 10 to 16 mm, or 3 to 16 mm. The die head openings can be conical or cylindrical. Conical openings have a broader opening at the intake and narrow to a smaller opening at the outflow. The outflow openings can have a diameter that is 30 to 100% of the intake openings. Within this range the outflow openings can have a diameter that is 30 to 70%, or, 50 to 100% of the intake openings. The conical openings can have an angle, 40, of 40 to 45 degrees. Cylindrical openings have substantially the same size opening at the intake and outflow locations.

Figure 2:
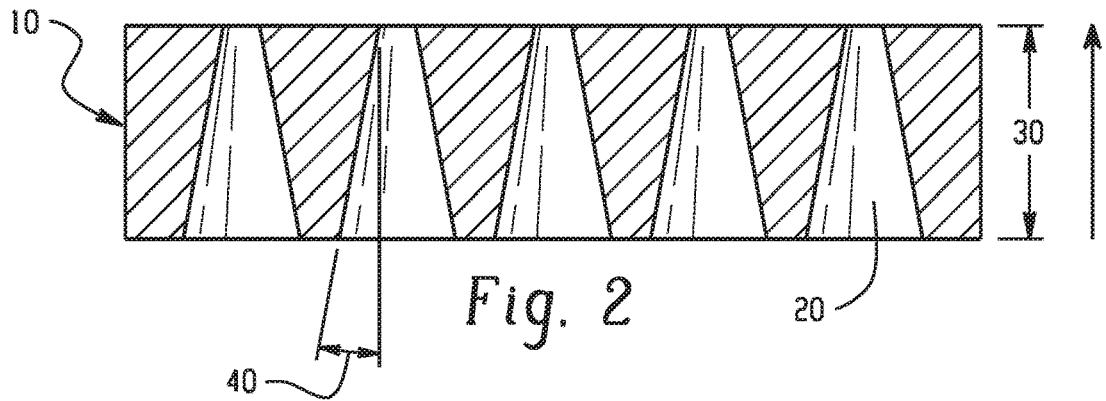
FIG. 2 is a transverse view along line A-A of FIG. 1.
Figure 3:
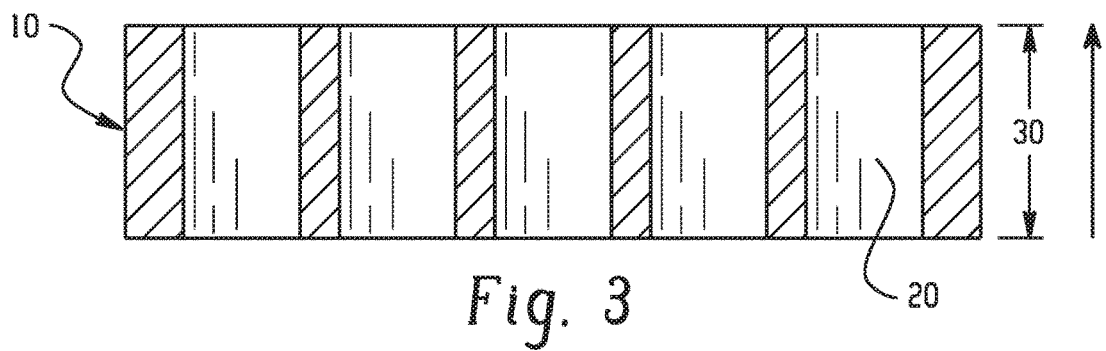
FIG. 3 is a representation of the intake side of a die head having cylindrical openings.

Turning now to FIG. 1, an exemplary die head 10 is shown with circular openings 20. The die head is shown from the intake side. A cross section of the die head taken along line A-A is shown in FIG. 2. FIG. 2 shows the die head 10 having conical openings 20. The conical openings have an angle 40 and a length 30. The arrow shows the direction of flow for the thixotropic composition. FIG. 3 shows a die head 10 having cylindrical openings 20.

In some embodiments the die head comprises a cooling jacket in which a coolant such as water is circulated around the die head openings at a temperature of 0 degrees Celsius to room temperature (typically 25 degrees Celsius).

After leaving the die head, the thixotropic mixture is cut into pellets. In some embodiments, the mixture is cut into pellets immediately upon leaving the die head (at the die face) using a knife. The knife can be of any shape or design required to obtain the desired pellet size. In some embodiments the knife comprises 2 or more blades.

The fertilizer component comprises an inhibitor, a micronutrient or a combination comprising at least one of the foregoing. The inhibitor can comprise a urease inhibitor, a nitrification inhibitor or a combination comprising at least one of the foregoing. Exemplary inhibitors include N-(n-butyl)thiophosphoric triamide (NBTPT), 3,4-dimethylpyrazole phosphate (DMPP), thio-urea (TU), dicyandiamide (DCD), phenyl phosphorodiamidate (PPDA), 2-chloro-6-(trichloromethyl)-pyridine (nitrapyrin), 5-ethoxy-3-trichloromethyl-1,2,4-thiadiazol (terrazole), 2-amino-4-chloro-6-methyl-pyrimidine (AM), 2-mercapto-benzothiazole (MBT), 2-sulfaminalamidothiazole (ST), and combinations comprising at least one of the foregoing.

A micronutrient is a botanically acceptable form of a compound comprising boron (B), copper (Cu), iron (Fe), chloride (Cl), manganese (Mn), molybdenum (Mo), nickel (Ni), zinc (Zn) or a combination comprising at least one of the foregoing. Exemplary inorganic compounds include sulfate, oxides and salt. Specific examples include borax, anyhydrous sodium tetraborate, sodium tetraborate pentahydrate, sodium tetraborate decahydrate, potassium metaborates, potassium tetraborates, potassium peroxyborates, calcium metaborates, ammonium pentaborates, ammonium tetraborates, $CuSO_4$, and $ZnSO_4$. Exemplary organic compounds include Fe EDTA, Fe EDDHA, Ca EDTA, Zn EDTA, and Mn EDTA. EDTA is an acronym for ethylenediaminetetraacetate and EDDHA is an acronym for ethylenediamine-N,N'-bis(2-hydroxyphenylacetate).

The fertilizer component is present in an amount of 0.25 to 55 weight percent, based on the combined weight of the fertilizer component, liquid component, binder and filler.

In some embodiments the fertilizer component comprises NBTPT. The NBTPT can be present in an amount of 0.25 to 6.0 weight percent, based on the combined weight of the fertilizer component, liquid component, binder and filler. Within this range, the amount of NBTPT can be 0.8 to 2.2 weight percent.

In some embodiments the fertilizer component comprises DCD. The DCD can be present in an amount of 10 to 45 weight percent, based on the combined weight of the fertilizer component, liquid component, binder and filler. Within this range, the amount of DCD can be 15 to 25 weight percent.

In some embodiments the fertilizer component comprises a combination of NBTPT and DCD. In these embodiments the combination of NBTPT and DCD can be present in an amount of 11 to 47 weight percent, based on the combined weight of the fertilizer component, liquid component, binder and filler. Within this range, the amount of NBTPT can be 0.8 to 2.2 weight percent and the amount of DCD can be 15 to 25 weight percent. The combined amount of NBTPT and DCD can be 24 to 27 weight percent.

The binder comprises Plaster of Paris, flour, starch, cellulose, gluten, colloidal silica, kaolin, bentonite, polyethylene glycol (PEG), polycaprolactone, low molecular weight polyvinyl acetate, or a combination comprising at least one of the foregoing. The binder is present in an amount of 25 to 90 weight percent based on the combined weight of the fertilizer component, liquid component, binder and filler.

The liquid component, e.g., aqueous component, comprises water and any optional liquid additives. It is also contemplated that optional solid additives may be at least partially dissolved in the liquid component with the proviso that the liquid component has a solids content of less than or equal to 10%. The liquid component is present in an amount of 7 to 25 weight percent, based on the combined weight of the fertilizer component, liquid component, binder and filler. Within this range the liquid composition may be present in an amount of 7 to 11, 11 to 16, or 20 to 25 weight percent.

In some embodiments the weight ratio of liquid component to binder is 5 to 30. Within this range the weight ratio can be 5 to 15, 10 to 20, or 15 to 30.

The filler comprises chalk powder, silica, rice husk, dried distillers grains with solubles (DDGS), calcite, calcium oxide, dolomite, talc, calcium carbonate, sand, chalk powder, sodium carbonate ($Na_2CO_3$), potassium carbonate ($K_2CO_3$), magnesium oxide (MgO), monopotassium phosphate ($KH_2PO_4$), sodium bicarbonate ($NaHCO_3$), or a combination comprising one or more of the foregoing. The filler is a material which can facilitate the release of inhibitors, micronutrients or both from the seed core. The filler can also help improve the properties of the core. The filler is a dry ingredient and hence may be supplied as described above with regard to dry ingredients. The filler is present in an amount of 5 to 50 weight percent, based on the combined weight of the fertilizer component, liquid component, binder and filler. Within this range the filler may be present in an amount of 5 to 20, 15 to 30, or 30 to 50 weight percent.

Additives can include viscoelastic agents, e.g., a polymer thickener, such as hydroxyl propyl methyl cellulose, polyethylene glycol, or a combination comprising at least one of the foregoing.

Optional additives can include, for example, surfactants, nucleation agents, recycled fertilizer particles, nucleating soil conditioners such as activated carbon, elemental sulfur, biocides such as pesticides, herbicides, or fungicides, wicking agents, wetting agents, heat stabilizers, adhesives such as cellulose, polyvinyl alcohols, fats, oils, gum arabics, vinylidene ultraviolet stabilizers, antioxidants, reducing agents, colorants, alternative binders (i.e., organochlorides, zeins, gelatins, chitosan, polyethylene oxide polymers, and acrylamide polymers and copolymers), and the like, as well as combinations comprising at least one of the foregoing.

The fertilizer seed core can have any shape or size desired for their intended use. The fertilizer seed cores have an average particle diameter of 0.5 to 4.0 millimeters (mm). Within this range the average particle diameter can be greater than or equal to 0.75, or greater than or equal to 1.0 mm. Also within this range the average particle diameter can be less than or equal to 3.5 mm, or less than or equal to 3.0 mm. In some embodiments at least 90% by weight of the fertilizer seed cores have a particle diameter of 0.6 to 1.4 mm, for example 0.7 to 1.2 mm. Particle diameter is determined according to "Size Analysis—Sieve Method" IFDC S-107 issued by International Fertilizer Development Center (IFDC) which is the most common and internationally approved method used to determine fertilizer particle size.

The fertilizer seed cores are subsequently fattened with additional components such as urea and/or excrement to produce a fertilizer granule. By incorporating the fertilizer components such as inhibitors and micronutrients into the seed core these components are protected from degradation resulting from conditions required for subsequent processing steps.

The method and extruders disclosed herein include at least the following embodiments:

Embodiment 1: A method of making a fertilizer seed core, the method comprising: supplying a fertilizer component, an liquid component, a binder and a filler to a zoned extruder comprising a die head, a screw, and at least three zones; mixing the fertilizer component, liquid component, binder and filler to yield a thixotropic mixture; and passing the thixotropic mixture through the die head, wherein the die head comprises openings 0.5 to 4 millimeter in diameter and wherein the end of the screw is 1-15 millimeters from the die head.

Embodiment 2: The method of embodiment 1, wherein the die head openings have a land length of 3 to 16 millimeters.

Embodiment 3: The method of embodiment 1 or 2, wherein the fertilizer component is supplied to the extruder and the liquid component and binder are supplied to the extruder following the fertilizer component.

Embodiment 4: The method of embodiment 1 or 2, wherein the fertilizer component and the binder are supplied to the extruder and the liquid component is supplied to the extruder following the fertilizer component and the binder.

Embodiment 5: The method of embodiment 4, wherein the fertilizer component and the binder are supplied to a first zone of the extruder and the liquid component is supplied to a second zone downstream of the first zone.

Embodiment 6: The method of any one of embodiments 1-5, wherein the binder is present in an amount of 25 to 90 weight percent, based on the combined weight of the fertilizer component, liquid component, binder and filler.

Embodiment 7: The method of any one of embodiments 1-6, wherein the liquid component is present in an amount of 7 to 25 weight percent, based on the combined weight of the fertilizer component, liquid component, binder and filler.

Embodiment 8: The method of any of the preceding embodiments, wherein the filler comprises chalk powder, silica, rice husk, dried distillers grains with solubles (DDGS), calcite, calcium oxide, calcium carbonate, dolomite, talc, sand, chalk powder, sodium carbonate, potassium carbonate, magnesium oxide, monopotassium phosphate, sodium bicarbonate, or a combination comprising one or more of the foregoing.

Embodiment 9: The method of any of the preceding embodiments, wherein the filler is present in an amount of 5 to 50 weight percent, based on the combined weight of the fertilizer component, liquid component, binder, and filler.

Embodiment 10: The method of any of the preceding embodiments, wherein the fertilizer component comprises a micronutrient, an inhibitor, or a combination comprising at least one of the foregoing.

Embodiment 11: The method of any of the preceding embodiments, wherein the binder comprises Plaster of Paris, flour, starch, cellulose, gluten, colloidal silica, kaolin, bentonite, or a combination comprising at least one of the foregoing.

Embodiment 12: The method of any of the preceding embodiments, wherein the liquid component comprises an aqueous component.

Embodiment 13, The method of any of the preceding embodiments, further comprising supplying a viscoelastic agent to the zoned extruder.

Embodiment 14: A method of making a fertilizer seed core, the method comprising: supplying a fertilizer component, an liquid component, a binder and a filler to a zoned extruder comprising a die head, a screw, and at least three zones; mixing the fertilizer component, liquid component, binder and filler to yield a thixotropic mixture; and passing the thixotropic mixture through the die head, wherein the die head comprises openings 0.5 to 4 millimeter in diameter and wherein the extrusion process has a residence of 5 seconds to 15 minutes.

Embodiment 15: The method of embodiment 14, wherein the fertilizer component is supplied to the extruder and the liquid component and binder are supplied to the extruder following the fertilizer component.

Embodiment 16: The method of embodiment 14, wherein the fertilizer component and the binder are supplied to the extruder and the liquid component is supplied to the extruder following the fertilizer component and the binder.

Embodiment 17: The method of embodiment 16, wherein the fertilizer component and the binder are supplied to a first zone of the extruder and the liquid component is supplied to a second zone downstream of the first zone.

Embodiment 18: The method of any of Embodiments 14-17, wherein the liquid component comprises an aqueous component.

Embodiment 19: The method of any of Embodiments 14-18, further comprising supplying a viscoelastic agent to the zoned extrude.

Embodiment 20: An extruder for performing the method of any of the preceding embodiments, wherein the extruder comprises a die head having openings with a land length of 3 to 16 millimeters.

Embodiment 21: The extruder of embodiment 20, wherein the die head comprises eccentric openings.

Embodiment 22: The extruder of embodiments 20 or 21, wherein the die head openings are conical.

Embodiment 23: The extruder of embodiment 22, wherein the die head has out flow openings having a diameter that is 30 to 70% of the intake opening diameter.

Embodiment 24: The extruder of any of embodiments 20-23, wherein the die head comprises a cooling jacket.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. Substantially as described herein generally refers to greater than or equal to 75%, for example, greater than or equal to 75%, for example, greater than or equal to 95%.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All references cited herein are incorporated by reference in their entirety. While typical embodiments have been set forth for the purpose of illustration, the foregoing descriptions should not be deemed to be a limitation on the scope herein. Accordingly, various modifications, adaptations and alternatives can occur to one skilled in the art without departing from the spirit and scope herein.

What is claimed is:

1. A method of making a fertilizer seed core, the method comprising:
   supplying a fertilizer component, a liquid component, a binder and a filler to a zoned extruder comprising a die head, a screw, and at least three zones;
   supplying the fertilizer component and the binder to the extruder and supplying the liquid component to the extruder following the fertilizer component and the binder;
   mixing the fertilizer component, the liquid component, the binder and the filler to yield a thixotropic mixture comprising equal distribution of the fertilizer component, the liquid component, the binder and the filler; and
   passing the thixotropic mixture through the die head, wherein the die head comprises openings 0.5 to 4 millimeter in diameter and wherein either one or both of the end of the screw is 1-15 millimeters from the die head and/or the extrusion process has a residence time of 5 to 15 minutes.

2. The method of claim 1, wherein the die head openings have a land length of 3 to 16 millimeters.

3. The method of claim 1, wherein the binder is supplied to the extruder following the fertilizer component.

4. The method of claim 1, wherein the fertilizer component and the binder are supplied to a first zone of the extruder and the liquid component is supplied to a second zone downstream of the first zone.

5. The method of claim 1, wherein the binder is present in an amount of 25 to 90 weight percent, based on a combined weight of the fertilizer component, the liquid component, the the binder and the filler.

6. The method of claim 1, wherein the liquid component is present in an amount of 7 to 25 weight percent, based on a combined weight of the fertilizer component, the liquid component, the binder and the filler.

7. The method of claim 1, wherein the filler comprises chalk powder, silica, rice husk, dried distillers grains with solubles (DDGS), calcite, calcium oxide, calcium carbonate, dolomite, talc, sand, chalk powder, sodium carbonate, potassium carbonate, magnesium oxide, monopotassium phosphate, sodium bicarbonate, or a combination comprising one or more of the foregoing.

8. The method of claim 1, wherein the filler is present in an amount of 5 to 50 weight percent, based on the combined weight of the fertilizer component, the liquid component, the binder, and the filler.

9. The method of claim 1, wherein the binder comprises Plaster of Paris, flour, starch, cellulose, gluten, colloidal silica, kaolin, bentonite, or a combination comprising at least one of the foregoing.

10. The method of claim 1, wherein the liquid component comprises an aqueous component.

11. The method of claim 1, further comprising supplying a viscoelastic agent to the zoned extruder.

12. The method of claim 1, wherein the die head comprises eccentric openings.

13. The method of claim 12, wherein the die head has out flow openings having a diameter that is 30 to 70% of an intake opening diameter of the die head.

14. The method of claim 1, wherein the die head openings are conical.

15. The method of claim 1, wherein the fertilizer component is present in an amount of 0.25 to 55 weight percent, based on a combined weight of the fertilizer component, liquid component, binder and filler.

16. The method of claim 1, wherein the fertilizer component comprises a nitrification inhibitor, an urease inhibitor, and/or a micronutrient.

17. The method of claim 16, wherein the fertilizer component comprises one or more of N-(n-butyl)thiophosphoric triamide, 3,4-dimethylpyrazole phosphate, thio-urea, dicyandiamide, phenyl phosphorodiamidate, 2-chloro-6-(trichloromethyl)-pyridine, 5-ethoxy-3-trichloromethyl-1,2,4-thiadiazol, 2-amino-4-chloro-6-methyl-pyrimidine, 2-mercaptobenzothiazole, and/or 2-sulfaminalamidothiazole.

18. The method of claim 16, wherein the fertilizer component comprises N-(n-butyl)thiophosphoric triamide and/or dicyandiamide.

19. The method of claim 16, wherein the fertilizer component is present in an amount of 0.25 to 55 weight percent, based on a combined weight of the fertilizer component, the liquid component, the binder and the filler.

20. The method of claim 1, wherein the binder is present at 25 to 87.75 weight percent, the liquid component is present at 7 to 25 weight percent, and the filler is present at 5 to 50 weight percent, based on a combined weight of the fertilizer component, the liquid component, the binder and the filler.

* * * * *